US010956466B2

(12) United States Patent
Upadhyay et al.

(10) Patent No.: US 10,956,466 B2
(45) Date of Patent: Mar. 23, 2021

(54) MACHINE LEARNING APPROACH TO CROSS-LANGUAGE TRANSLATION AND SEARCH

(71) Applicant: PayPal, Inc., San Jose, CA (US)

(72) Inventors: Rushik Upadhyay, Milpitas, CA (US); Dhamodharan Lakshmipathy, San Jose, CA (US); Nandhini Ramesh, San Jose, CA (US); Aditya Kaulagi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 160 days.

(21) Appl. No.: 16/232,796

(22) Filed: Dec. 26, 2018

(65) Prior Publication Data

US 2020/0210465 A1 Jul. 2, 2020

(51) Int. Cl.
*G06F 16/33* (2019.01)
*G06F 16/31* (2019.01)
(Continued)

(52) U.S. Cl.
CPC ........ *G06F 16/3337* (2019.01); *G06F 16/313* (2019.01); *G06F 40/284* (2020.01); *G06F 40/53* (2020.01); *G06N 20/00* (2019.01)

(58) Field of Classification Search
CPC .. G06F 16/248; G06F 16/9535; G06F 16/951; G06F 16/24578; G06F 16/313;
(Continued)

(56) References Cited

U.S. PATENT DOCUMENTS 6,466,901 B1 * 10/2002 Loofbourrow ........ G06F 40/289
704/9
2003/0074185 A1 4/2003 Kang
(Continued)

OTHER PUBLICATIONS

Chen et al. "Combining multiple sources for short query translation in Chinese-English cross-language information retrieval", IRAL '00: Proceedings of the fifth international workshop on Information retrieval with Asian languages, 2000. Retrieved on Jul. 7, 2020, retrieved from https://dl.acm.org/doi/abs/10.1145/355214.355217, Entire document.
(Continued)

*Primary Examiner* — Huyen X Vo
(74) *Attorney, Agent, or Firm* — Haynes and Boone, LLP

(57) ABSTRACT

Techniques are disclosed relating to implementing a machine learning approach to cross-language translation and search. In certain embodiments, a method may include receiving a plurality of characters of a first language that are unsegmented and grouping the plurality of character into multiple groups. The method also includes determining a set of word tokens based on one or more transliterations of the multiple groups and one or more translations of the multiple groups to a second language. Further, the method includes generating one or more word token solution sets by querying an index file using the one or more word tokens. The method also includes determining whether the index file references an entity name corresponding to the plurality of characters of the first language based on comparing the one or more token solution sets with the index file.

20 Claims, 6 Drawing Sheets

(51) Int. Cl.
*G06N 20/00* (2019.01)
*G06F 40/53* (2020.01)
*G06F 40/284* (2020.01)

(58) Field of Classification Search
CPC .... G06F 16/2455; G06F 16/00; G06F 16/243; G06F 16/635; G06F 16/638; G06F 16/90332; G06F 16/156; G06F 16/338; G06F 16/9035; G06F 16/24553; G06F 16/61; G06F 16/81; G06F 16/90335; G06F 40/20; G06F 16/2425; G06F 40/30; G06F 16/33; G06F 16/3337; G06F 40/53; G06F 40/284; G10L 15/22; G10L 15/1815; G10L 2015/088; G10L 2015/223; G06N 20/00
See application file for complete search history.

(56) References Cited

U.S. PATENT DOCUMENTS

| | | | |
|---|---|---|---|
| 2008/0065607 A1* | 3/2008 | Weber | G06F 16/313 |
| 2009/0150370 A1 | 6/2009 | Christensen et al. | |
| 2011/0137636 A1* | 6/2011 | Srihari | G06F 40/53 |
| | | | 704/2 |
| 2013/0041647 A1 | 2/2013 | Ramerth et al. | |
| 2014/0012563 A1* | 1/2014 | Caskey | G06F 40/58 |
| | | | 704/2 |
| 2016/0162545 A1 | 6/2016 | Bolivar | |

OTHER PUBLICATIONS

International Application No. PCT/IB2019/001453, International Search Report dated Aug. 6, 2020, 20 pages.

* cited by examiner

| Group # | Chinese Input | Mandarin Pinyin 1 | Mandarin Pinyin 2 | Cantonese Pinyin | Dictionary Translation |
|---|---|---|---|---|---|
| 1 | 梅利銀行 | | | | |
| 2 | 梅 | mei | | mooi | plum/plum flower/ japanese apricot/ surname mei |
| 3 | 利 | li | | lei | Interest/advantage/ favorable/profie/benefit/do good/surname li/sharp |
| 4 | 銀行 | yin hang | yin heng | ngan haang hang hong | bank |

FIG. 4

MACHINE LEARNING APPROACH TO CROSS-LANGUAGE TRANSLATION AND SEARCH

BACKGROUND

Technical Field

This disclosure relates generally to matching textual information and, more specifically, to implementing a machine learning approach to cross-language translation and search.

Description of the Related Art

The ability to match textual information is a frequent endeavor among various computer systems today. For instance, Internet search algorithms attempt to match input text from a user with webpages that contain similar text to the input text. Numerous other contexts also exist in which a system attempts to match an input text with other text stored in a database. However, in cases where the input text corresponds words of a logographic language, using the input text to search for matches in data that includes text of a different language can present challenges.

BRIEF DESCRIPTION OF THE DRAWINGS

FIG. 4 is a diagram illustrating a data structure that stores associations between groups of characters, romanizations, and dictionary translations, according to some embodiments.

Figure 1:
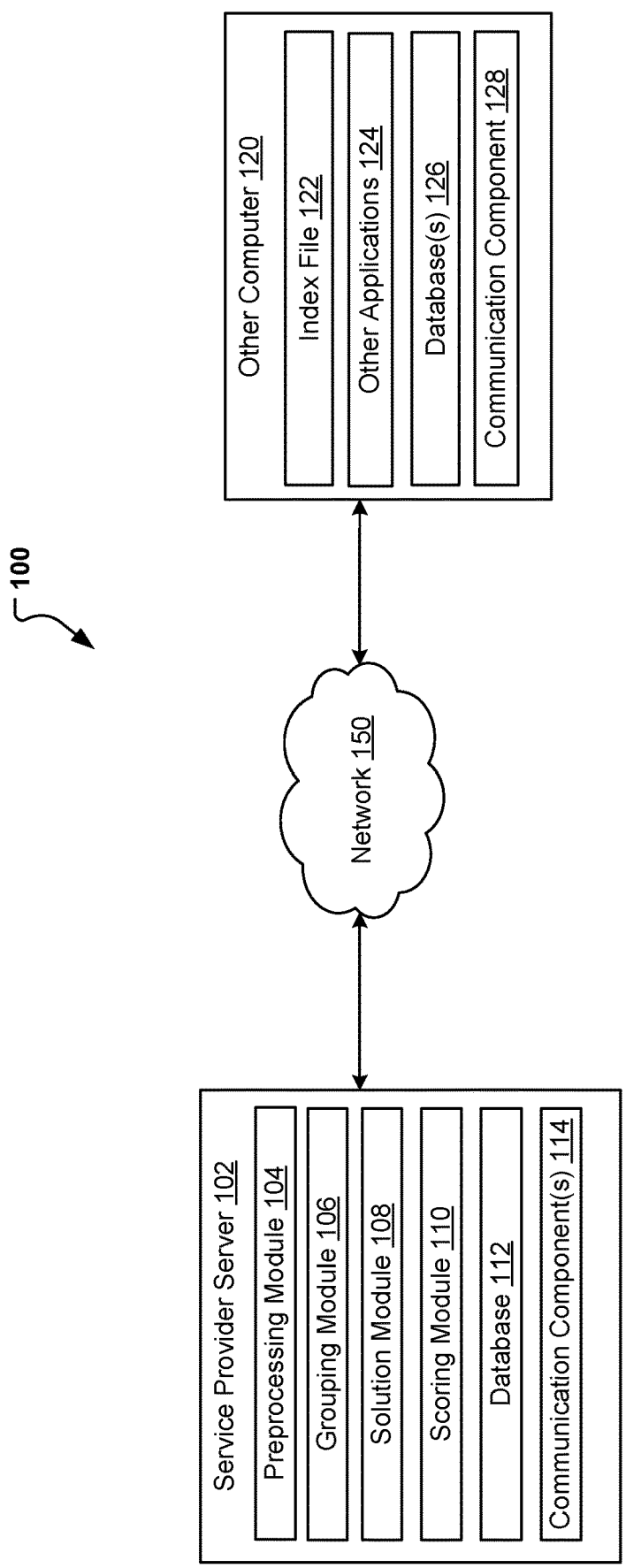
FIG. 1 is a block diagram illustrating an example system that implements a machine learning approach to cross-language translation and search, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "grouping module configured to group input text" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As used herein, the term "logographic language" refers to a language that has a corresponding writing system that uses logographs, which are written characters that each represent a word or phrase. Examples that use logographic writing systems in whole or in part include, but are not limited to, Chinese, Japanese, Korean, and Vietnamese.

As used herein, the term "word token" refers to an instance of a word, which may be a series of Roman characters that are separated by a delimiter (e.g., a space, punctuation, or other type of delimiter).

DETAILED DESCRIPTION

Techniques are disclosed for implementing a machine learning approach to cross-language translation and search. More particularly, the present disclosure relates to a system for matching text from a logographic language, such as Chinese, to text of a second language, such as English.

In certain embodiments, a service provider server may include a preprocessing module, a grouping module, a solution module, and a scoring module. The service provider server may be configured to receive input text of the logographic language and to perform a search against text included in an index file in order to identify any matching text included in the index file. Notably, the text in the index file may be text of a second language that is different from the logographic language. As such, the techniques described herein can be applied to various contexts. For example, the index file may be an inverted index corresponding to one or more webpages, and the input text may correspond to one or more search terms to be searched against the one or more webpages. In another example, the index file may store word tokens that correspond to entity names, and the input text may correspond to one or more names of the parties participating in a digital transaction being processed by the service provider server. It will be appreciated that numerous other contexts in which input text is searched against an index file or any other type of data structure are also possible.

According to a particular embodiment, the service provider server is configured to perform, via the preprocessing module, preprocessing with respect to the index file and/or other data. For instance, the service provider server may be configured to analyze the index file and assigned importance scores to certain word tokens included in the index file. The importance scores may affect final calculation of similarity scores between the input text and certain entries in the index file, where an entry refers to a unit of search in the index file, and each entry includes one or more word tokens. For instance, consider a particular entry that includes a first word token with a high importance score and second word token with a low importance score. A first input text may include a word token that matches the first word token but none that match the second word token, and a second input text may include a word token that matches the second word token but not the first word token. As such, the service provider server may calculate a similarity score for the first input text (e.g., with respect to the particular entry of the index file) that is higher than a similarity score for the second input text.

The service provider server may also be configured to group the input text into one or more groups, such as via its grouping module. The input text may be grouped according to a grouping algorithm, which may be provided by a third-party. Each group may include one or more characters of the input text, and none of the characters of each group overlap with characters of another group. For instance, in embodiments where the input text is Chinese and the entries in the index file include English word tokens, the characters included in the input text may be grouped according to the SmartChineseAnalyzer module provided by Apache Lucene.

Further the service provider may, for each group, determine at least one corresponding romanization and dictionary definition. In some embodiments, the romanization may also be a transliteration to the second language. Referring again to the above embodiment, the service provider server identifies a corresponding pinyin romanization of the Chinese characters included in each group. In certain cases, the service provider server may identify more than one pinyin romanization scheme for a group. The dictionary definition for a group is a translation of the characters included in the group to the second language as provided by a dictionary source. Both the pinyin romanization and the dictionary source are stored in the same or separate databases that are accessible by the service provider server. The databases may be local to the service provider server or may be remote databases that can be accessed by the service provider server via a network.

Thus, for each group of characters, the service provider server may associate one or more romanizations and one or more dictionary translations. These associations may be stored in a table or other type of data structure by the service provider server. From the romanization(s) and dictionary translation(s), the service provider server (e.g., via the solution module) generates a set of word tokens and uses the set of word tokens to perform a search on the index file. According to a particular embodiment, in order to generate the set of word tokens, the service provider server first extracts all the romanizations and dictionary translations corresponding to every group. Each word from these romanizations and dictionary translations are considered word tokens. The service provider server then removes any duplicate word tokens. The remaining word tokens are the set of word tokens from which the service provider server selects one or more subsets to query the index file. For example, the service provider server may generate one or more n-grams from the set of word tokens (e.g., a trigram) and use the generated n-grams to perform a full text search on the index file.

The results of the search/query correspond to a set of entries of the index file. The service provider generates a set of word token solution sets by comparing the word token(s) included in the set of entries with the set of word tokens previously generated by the service provider server. Such comparisons are made according to solution criteria, and word tokens (from the set of word tokens) that satisfy the solution criteria are used by the service provider server to generate the set of word token solution sets. As such, each word token solution set is associated with a respective entry of the set of entries.

Each of the word token solution sets in the set of word token solution sets may be analyzed according to a set of knockout rules. For instance, if the service provider server determines that a particular word token solution set satisfies any of the knockout rules, the service provider server removes the particular word token solution set from the set of word token solution sets. Thus, evaluating the set of word token solution sets according to the knockout rules results in a set of remaining word token solution sets. Each of the word token solution sets in the set of remaining word token solutions sets is compared with its associated entry from the index file to determine a respective similarity score. The service provider server determines a match between a particular word token solution set and its associated entry if their respective similarity score satisfies a score threshold.

FIG. 1 is a block diagram illustrating an example system 100 for implementing a machine learning approach to cross-language translation and search. In the illustrated embodiment, the system 100 includes a service provider server 102 of a service provider in communication with other computer 120 via a network 150. The service provider server 102 may be configured to implement the cross-language translation and search in various contexts.

For example, the cross-language translation and search may be used as part of a general search algorithm. The service provider server 102 may receive an input text (e.g., a search term) and compare the input text with other text data, where the input text is in a logographic language and the other text data is in a second language that is different from the logographic language. As such, the service provider server 102 may determine if any of the text in the other text data matches the input text. In one embodiment, the search algorithm corresponds to an Internet search, and the input text is provided by the other computer 120. The service provider 102 performs the cross-language translation and search to identify any webpages that include text data that matches the input text. More particularly, the service provider 102 may determine whether a similarity score between the text data of the webpages and the input text satisfies a score threshold. A match is identified if the score threshold is satisfied.

In another embodiment, the service provider server 102 analyzes payment transactions of a payment service to determine whether any users of the payment service (e.g., payors, payees, customers, merchants, etc.) is a bad actor. Bad actors may be individuals and/or organizations that are known to perpetrate fraud, terrorism, and/or other criminal or undesirable activities. To this end, the service provider server 102 may receive a set of entity names that are stored in an index file. The entity names correspond to entities that are known to be bad actors (e.g., entities that are included on a blacklist provided by a government agency or other party). The service provider server 102 may monitor payment transactions of the payment service to determine whether any users of the payment service and/or parties to the payment transactions are included in the blacklist. For instance, for certain payment transaction, the service provider server 120 may perform the cross language translation and search with respect to the users associated with the payment transaction and the blacklist. Based on the cross language translation and search, if the service provider server 102 determines one or more of the users are included in the blacklist, the service provider server 102 may decline the payment transaction, flag the identified user(s) and the payment transaction for law enforcement, and/or take other remedial action. For instance, the service provider 102 may, for each name associated with a user, determine whether a similarity score between the name and any of the names included in the blacklist satisfies a score threshold. The name may be represented by text of a logographic language while the set of entity names may be in a language with a romanized alphabet A match is identified if the score threshold is satisfied.

It will be appreciated that the above examples are for illustrative purposes and that the cross-language translation and search can be implemented in various other contexts. Further, the index file may be stored on the service provider server 102 and/or any other third-party computer or database, such as other computer 120.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, the service provider server 102 may include a preprocessing module 104, a grouping module 106, a solution module 108, a scoring module 110, a database 112, and communication components 114. Each components of the service provider 102 may communicate with each other to implement the ability to perform cross-language translation and search, as will be describe in more detail below. More particularly, the service provider server 102 may receive input text of a logographic language and perform a search, using the input text, against data that includes text of a second language that is different from the logographic language. The second language is a language having a writing system that uses the Roman alphabet. It will be appreciated that while certain examples described herein may describe receiving Chinese input text and searching documents in English for matches to the Chinese input text, the techniques described herein may also be applied to other instances where a logographic languages is is used to search against text of another language that uses a roman alphabet.

The preprocessing module 104 may be configured to preprocess certain data before any cross-language translation and searches are performed. According to certain embodiments, searches may be performed with respect to an index file that stores multiple entries. Each entry of the index file may include one or more word tokens and in some embodiments, may correspond to a respective entity name. The preprocessing module may be configured to determine the relative importance of each word token of each entry by assigning importance scores to each of the word tokens. An example scoring methodology for ascertaining importance is described in more detail below with reference to FIG. 5. In some embodiments, certain word tokens included in the index file are classified as "important" if their importance scores satisfy an importance score threshold. The respective importance scores of each word token of each entry may affect the determination of word token solution sets, as described in further detail below.

The preprocessing module 104 may also be configured to preprocess a dictionary file that stores translations and definitions of characters of the logographic language to the second language. As such, for each word and/or set of characters of logographic language, the dictionary file may store one or more meanings. In certain embodiments, the preprocessing module 104 may filter extraneous words (in the second language) that may be included in the dictionary file. These extraneous words may be predetermined words and/or words that conform to a particular format.

After the filtering, the preprocessing module 106 may determine a respective frequency of each remaining word in the dictionary file. The frequency of a word refers to a number of times the word is included in the dictionary file. Further, for each word/set of characters in the logographic language, its meanings are ranked based on the frequency of the words included in the meanings. Words that have a high frequency may lower the rank of a meaning, and words that have a relatively low frequency may increase the rank of the meaning.

For a particular word/set of characters of the logographic language, the preprocessing module 104 identifies the two highest ranked meanings. Additionally, the preprocessing module 104 identifies words in the meanings of the particular word/set of characters that correspond to nouns. To this end, the preprocessing module 104 stores the two highest ranked meanings and the identified nouns as the compact meaning for the particular word/set of characters.

The grouping module 106 may be configured to group input text received by the service provider server 102 into multiple groups according to a grouping algorithm. The input text may be of a logographic language. Grouping may be performed because the text of certain logographic languages are unsegmented in that words are not clearly marked by delimiters (e.g., space, commas, other punctuation, etc.). For instance, words in English are delimited by a space. In contrast, there are no such delimiters for words in Chinese. As an example, the Chinese phrase 昆仑银行 means "Bank of Kunlun," in which the first two characters mean "Kunlun" and the last two characters together mean "Bank".

In certain embodiments, the grouping algorithm may be provided by a third-party entity and is accessible and/or otherwise usable by the service provider server 102. In instances where the input text is in Chinese and the index file being searched is in English, the grouping algorithm may be the SmartChineseAnalyzer module provided by Apache Lucene. The groups generated by the grouping module 106 may each include one or more distinct characters from the input text, and none of groups have overlapping characters. In other words, the intersection between the characters of any two groups is zero, assuming there are no repeated characters in the input text.

For each group, the grouping module 106 is also configured to identify romanizations corresponding to the character(s) in each group as well as respective dictionary translations corresponding to each group. For instance, the characters included in each group may be provided as input into a romanization module that generates a corresponding romanization for each group. In certain embodiments, more than one romanization may be generated for the characters in a particular group (e.g., according different romanization schemes). The romanization module may be executed by the service provider server or may be provided by a third-party source.

The characters included in each group may also be provided as input into a dictionary module. The dictionary module may access the dictionary file using the characters and output the translation of the characters of a particular group in the second language (e.g., the compact meaning of the characters). As previously discussed, the dictionary file may have been previously preprocessed by the preprocessing module 106. In certain embodiments, the dictionary module may be executed by the service provider server while in other embodiments, the dictionary module may be executed by a third-party computer, such as other computer 120, in communication with service provider server 102. The grouping module 106 may associate each group with its respective romanization(s) and dictionary translation(s). The associations may be stored in table, such as the table illustrated in FIG. 5, and/or any other type of data structure.

The solution module 108 is configured to analyze the associations to generate a set of word tokens. For example, the set of word tokens may be comprised of all the words included in the romanizations and dictionary translations associated with the groups with any duplicate tokens being removed. Using the set of word tokens, the solution module 108 queries the index file. According to a particular embodiment, the solution module 108 creates trigrams (comprised of any three word tokens) from the set word tokens and performs a full text search on the index file using the trigrams. It will be appreciated, however, that any n-gram may be used to search the index file. It is also understood that an n-gram is any sequence of n words.

Based on the results of querying the index file, the solution module generates a set of word token solution sets. For example, each result of the query corresponds to a respective entry of the index file. For each entry of the results, the solution module 108 compares that entry with the set of word tokens previously generated by the solution module 108. Based on this comparison, the solution module 108 may determine a subset of the set of word tokens that "match" the entry according to solution criteria. This subset is a word token solution set for the entry.

More particularly, each word token of a particular entry of the results is compared with each token in the set of word tokens according to the solution criteria. According to a particular embodiment, a first word token from the set of word tokens is identified as a match with a second word token of the particular entry if either of two conditions is satisfied. The first condition is if a similarity between the first word token and the second word token satisfies a similarity threshold. For instance, the similarity may be calculated based on an edit distance between the first word token and the second word token.

The second condition is if solution module 108 determines an exact match between the first word token and the second word token based on data stored in a lemmas file. The lemmas file may store one or more pairs of word tokens. As such, the solution module 108 may compare the first word token and the second word token to the lemmas, and if the solution module 108 determines an exact match between a pair of word tokens and the first word token and the second word token, the second condition may be satisfied. For instance, the lemmas file store the pair of word tokens "trade" and "trading." If the first word token corresponds to trade and the second word token corresponds to trading, the second condition is satisfied.

Thus, each solution set may be associated with a corresponding entry from the results. Further, a particular entry can be associated with any number of word token solution sets, including zero solution sets or multiple solution sets. In some embodiments, a word token solution set for a particular entry may be stored in the following format: [(queryToken1, matchToken1), (queryToken2, matchToken2), . . . ], where each queryToken is a word token from the particular entry, and each matchToken is a token from the set of word tokens.

After generating the set of word token solution sets, the solution module 108 may identify, based on elimination criteria, whether any word token solution sets should be removed from the set of word token solution sets. In certain embodiments, the elimination criteria corresponds to a set of elimination rules where if a particular word token solution set satisfy any of the elimination rules, the particular word token solution set is removed from the set of word token solution sets. Example elimination criteria are discussed below.

The scoring module 110 may be configured to determine similarity scores between two words. In certain embodiments, the scoring module 110 may determine similarity scores for the remaining word token solution sets that have not been removed according to the elimination criteria. For example, the score module 110 may determine a similarity score between each remaining word token solution set and its associated entry. If the similarity score for a particular word token solution set and its associated entry satisfies a similarity score threshold, the scoring module 110 may identify the associated entry as a match to the input text of the logographic language. It will be appreciated that the scoring module 110 may use any type of algorithm for determining the similarity score.

The database 112 stores various information used to implement the techniques described herein. In certain embodiments, the database 112 may store the index file, the lemmas file, associations between the different groups, romanization, and dictionary translations, word token solution sets, and/or the like.

The communication component 114 may be configured to communicate with various other devices, such as the user computer 120 and/or other devices. In various embodiments, communication component 114 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the other computer 120, which includes an index file 122, other applications 124, database 126, and communication component 128. According to one or more embodiments, the other computer 120 may provide, via the user application 122, an input text to the service provider server 102. As previously discussed, the input text could be an Internet search term, information included in a payment transaction, and/or any other text data used in a search. In response, the service provider server 102 may be configured perform the machine learning approach to cross-language translation and search using the input text with respect to other textual information, such as textual information included in one or more webpages, lists, blacklists, and/or the like.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
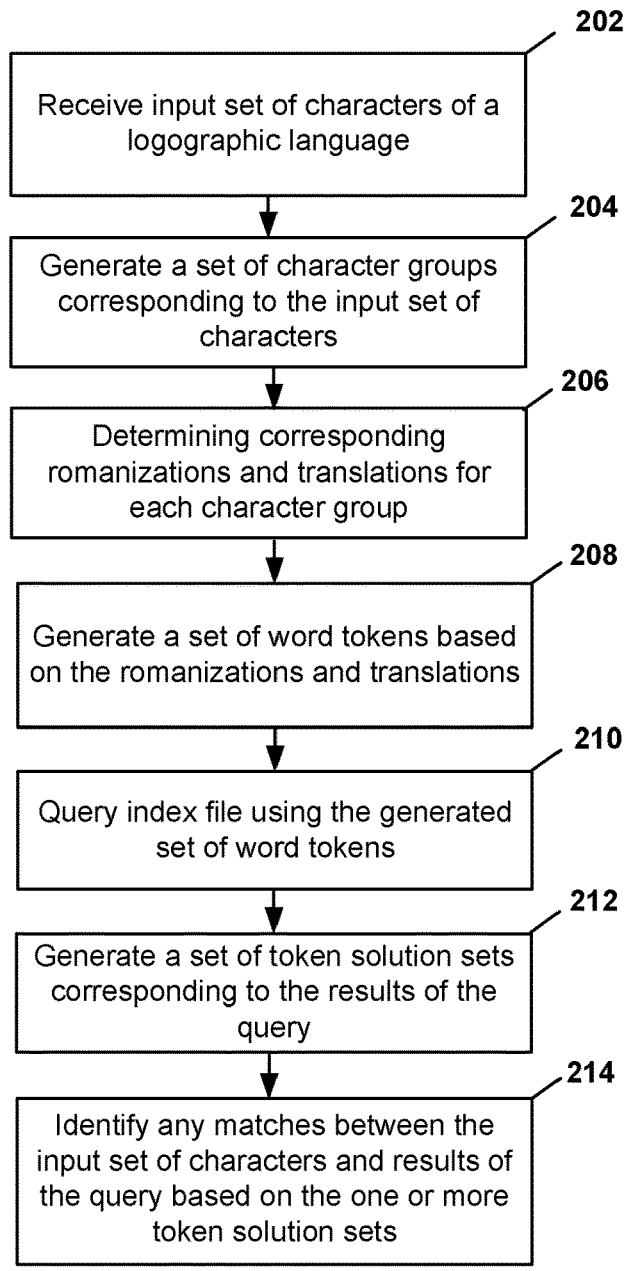
FIG. 2 illustrates a flow diagram illustrating a method for identifying a match for input text of a logographic language, according to some embodiments.
Figure 3:
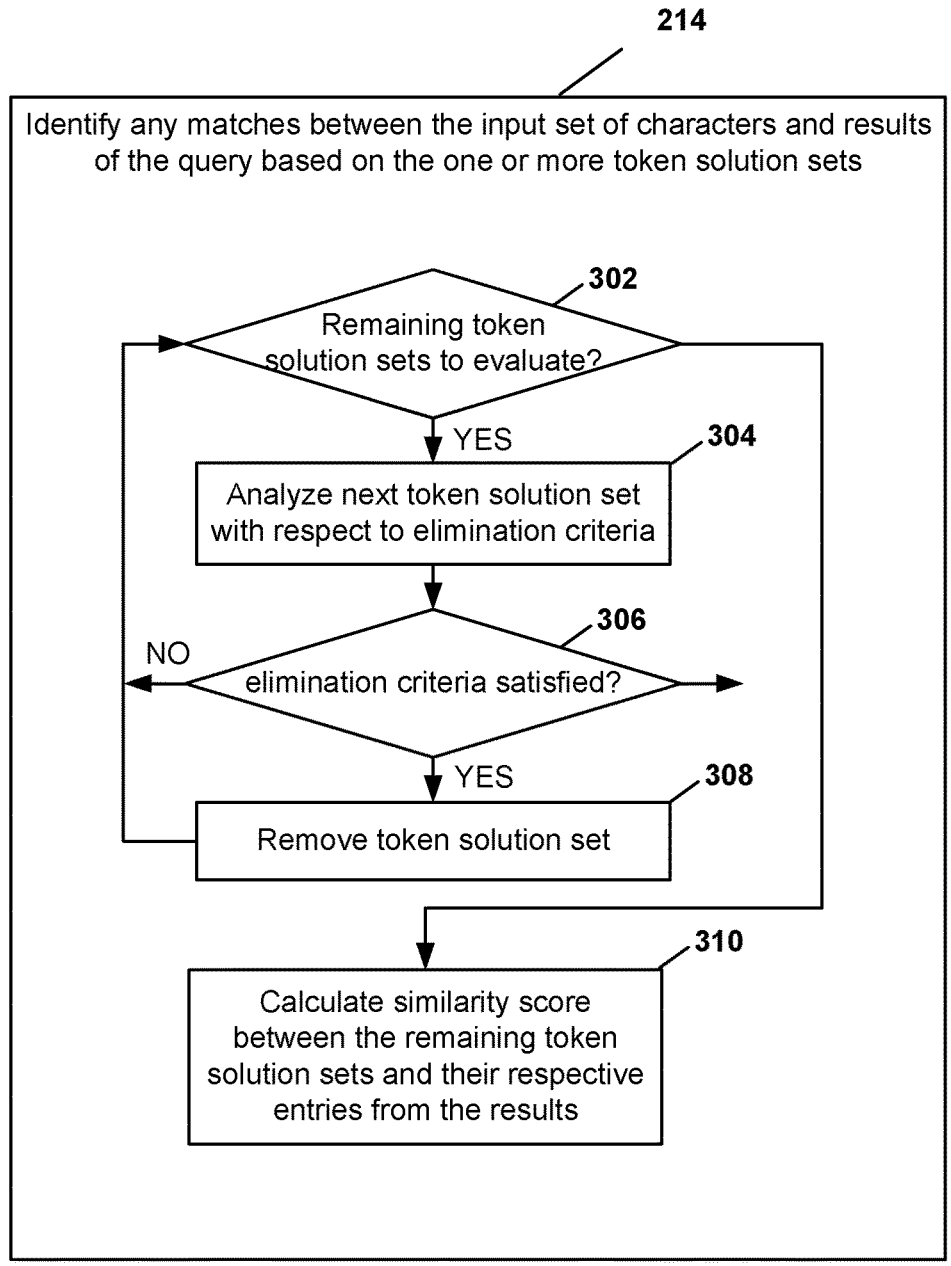
FIG. 3 illustrates a flow diagram illustrating a method for using token solution sets to identify matches for input text of a logographic language, according to some embodiments.

FIG. 2 illustrates an example flow diagram of a method 200 for implementing a machine learning approach to cross-language translation and search, according to some embodiments. FIG. 3 illustrates an example flow diagram for performing step 214 of method 200. FIG. 4 illustrate a diagram of an example table that stores associations between different groups of input Chinese characters, romanizations, and dictionary translations. FIG. 2 and FIG. 3 are described in conjunction with FIG. 4, with additional references to the components depicted in FIG. 1.

The method 200 begins at step 202, where the service provider server 102 receives an input set of characters of a logographic language. The service provider server 102 may be configured to determine whether any text and/or word tokens included in an index file match the input set of characters. The text and/or word tokens included in the index file are in a second language that is different from the logographic language. In the example show in FIG. 4, the input set of characters is the Chinese phrase "梅利銀行" which translates to Bank Meili, and the index file includes word tokens in English.

At step 204, the grouping module 106 generates a set of character groups 402 corresponding to the input set of characters. In FIG. 4, the input set of characters is grouped into three groups: group 2, group 3, and group 4 (group 1 represents the input set of characters). Group 2 includes the character "梅", group 3 includes the character "利", and group 4 includes the characters "銀行" As previously discussed, in certain embodiments, the input set of characters is grouped according to the SmartChineseAnalyzer module.

At step 206, the grouping module 106 determines corresponding romanizations and translations for each of the character groups 402. In FIG. 4, each group is associated with a first Mandarin Pinyin 406, a second Mandarin Pinyin 408, a Cantonese Pinyin 410, and a dictionary translation 412. It is understood that the first Mandarin Pinyin 406, the second Mandarin Pinyin 408, and the Cantonese Pinyin 410 are different respective romanization schemes for Chinese characters. Further, each of the first Mandarin Pinyin 406, the second Mandarin Pinyin 408, the Cantonese Pinyin 410, and the dictionary translation 412 for each character group 402 may include any number of word tokens.

At step 208, the solution module 108 generates a set of word tokens based on the romanizations and translations. For instance, in FIG. 4, the set of word tokens includes all of the word tokens included in the first Mandarin Pinyin 406, the second Mandarin Pinyin 408, the Cantonese Pinyin 410, and the dictionary translation 412 for each group, minus any duplicate tokens. As such, the set of word tokens include "mei, mooi, li, lei, yin, xing, heng, ngan, hang, hang, hong, yinxing, meili, mooilei, plum, flower, Japanese, apricot, surname, interest, advantage, favorable, profit, benefit, do, good, sharp, and bank."

In some embodiments, the generated set of word tokens may also include one or more connected pinyins that are formed by combining one or more word tokens included in the pinyins 406, 408, 410. The connected may be formed by appending pinyins in character groups the included more than one word token and/or by combining various pinyin word tokens from character groups that include only one character. Using the example in FIG. 4, the connected pinyins included in the set of word tokens include "yinxing" and "meili".

At step 210, the solution module 108 queries the index file using the generated set of word tokens. According to particular embodiment, the solution module 108 generates trigrams based on the set of word tokens and uses the generated trigrams to search the index file. The trigrams are formed using three word tokens from the set of word tokens. For instance a first trigram may be "mei flower bank" and a second trigram may be "hang yinxing surname". The query may be executed by performing a text search on the index file using such trigrams. As such, the query may return a set of results in which each of the results corresponds to a respective entry of the index file.

At step 212, the solution module 108 generates a set of word token solution sets corresponding to the results of the query performed in step 210. As previously discussed, the word tokens of each entry from the set of results may be compared with the set of word tokens according to solution criteria. For instance, if a particular entry of the results is "Meili Flower Bank", each of the word tokens in the particular entry ("Meili", "Flower", and "Bank") may be compared with each of the words in the set of word tokens (mei, mooi, li mooilei, lei, yin, xing, heng, ngan, hang, hang, hong, yinxing, meili, plum, flower, Japanese, apricot, surname, interest, advantage, favorable, profit, benefit, do, good, sharp, and bank). The comparison may be performed to identify "matching" word tokens from the set of word tokens according to the solution criteria.

In certain embodiment, each of the tokens of the particular entry may have one or more matching tokens from the set of word tokens. Based on these matching tokens, the solution module 108 may generate the set of word token solution sets corresponding to the particular entry. As previously discussed, a word token solution set may be stored in the format: [(queryToken1, matchToken1), (queryToken2, matchToken2), . . . ], where each queryToken is a word token from the particular entry, and each matchToken is a token from the set of word tokens.

For example, for the entry "Meili Flower Bank", the solution module 108 may identify the word tokens "meili" and "mooilei" as matches for "Meili". The solution module 108 may also identify the word token "flower" from the set of word tokens as a match for "Flower" and the word token "bank" from the set of word tokens as a match for "Bank." As such, the solution module 108 may determine two word token solution sets for the entry. The first solution set may be [(Meili, meili), (Flower, flower), (Bank, bank)], and the second solution set may be [(Meili, mooilei), (Flower, flower), (Bank, bank)].

At step 214, the scoring module 110 identifies any matches between the input set of characters and the results of the query on the index file based on the one or more word token solution sets. For instance, the scoring module 100 may score each word token solution set with its corresponding entry of the results. If a score between a word token solution set and its associated entry satisfies a similarity score threshold, the scoring module 108 determines the entry as a match for the input text (e.g., "梅利銀行"). Using the above example, the scoring module 110 may determine a first score for the first solution set (meili flower bank) and the entry "Meili Flower Bank" and a second score for the second solution set (mooilei, flower bank) and the entry. If either the first score or the second score satisfies the similarity score threshold, the scoring module 110 determine that the entry "Meili Flower Bank" is a match for the input text. If neither the first score nor the second score satisfies the similarity score threshold, the scoring module 110 determines that the entry "Meili Flower Bank" is not a match for the input text.

It will be appreciated that the above examples are merely illustrative, and that actual groupings, generated sets of word tokens, word token solution sets, similarity scores, and the like for the input text may differ from the examples described.

Referring now to FIG. 3, a more detail description of implementing step 214 of FIG. 2 with respect to elimination criteria is provided. At step 302, the solution module 108 determines whether there are any remaining word token solution sets (from the set of word token solution sets generated at step 212) to evaluate with respect to the elimination criteria. If so, the method may proceed to step 304.

At step 304, the solution module 108 analyzes the next word token solution set according to the elimination criteria. If the next word token solution set satisfies the elimination criteria, the next token solution set is removed from the set of word token solution sets, and the method 300 proceeds back to step 302. If the next word token solution set fails to satisfy the elimination criteria, the method 300 proceeds directly back to step 302, and the next word token solution set remains in the set of word token solution sets.

Further, referring back to step 302, if there are no more remaining word token solution sets to evaluate from the set of word token solution sets, the method 300 proceeds to step 310. At step 310, the scoring module 110 calculates respective similarity scores between the remaining token solution sets and their respective entries from the results from the query performed at step 210.

Elimination Criteria

The following is a non-exclusive list of rules that may be used as elimination criteria. As such, certain implementations may include more or fewer rules and/or the same or different rules. As previously discussed, if a word token solution set satisfies any of the rules in the elimination criteria, the word token solution set may be removed from the set of word token solution sets.

A first rule is that a word token solution set must include at least k important word tokens from its associated entry of the index file. As previously discussed, the preprocessing module 104 determines importance of different word tokens from the index file. Further, the number k is based on the number word tokens included in the associated entry. In one example, if t is the number of word tokens in the associated entry, k may be calculated as follows:
1. If $t \le 2$, $k=t$.
2. If $2 < t \le 4$, $k=t-1$
3. If $4 < t \le 6$, $k=t-2$
4. If $6 < t \le 8$, $k=t-3$
5. If $8 < t \le 10$, $k=t-4$
6. If $10 < t$, $k=t-5$ A second rule is that for a word token solution set, each word token in the corresponding entry is identified as a romanization or not a romanization. Each word token in the entry that is identified as a romanization must have an exact match with a word token from the word token solution set.

A third rule is that a word token solution set cannot have word tokens that correspond to romanizations and dictionary translations from the same character group.

A fourth rule is that if each character group includes only one character of the logographic language, then a word token solution set must include at least one word token from each character group.

A fifth rule is that for a word tokens solution set, a word token that corresponds to a dictionary translation must have an exact match with a word token from the corresponding entry.

A sixth rule is that word tokens from a minimum number of character groups must be included in a word token solution set. The minimum number of character groups depends on the total number of character groups. In one example, if the minimum number of character groups is c, and the total number of character groups is n, then:
1. $c=n$ if $n \le 2$.
2. $c \ge (n-1)$ if $2 < n \le 4$.
3. $c \ge (n-2)$ if $4 < n \le 7$.
4. $c \ge (n-3)$ if $7 < n \le 10$.
5. $c \ge (n-3)$ if $n > 10$.

Figure 5:
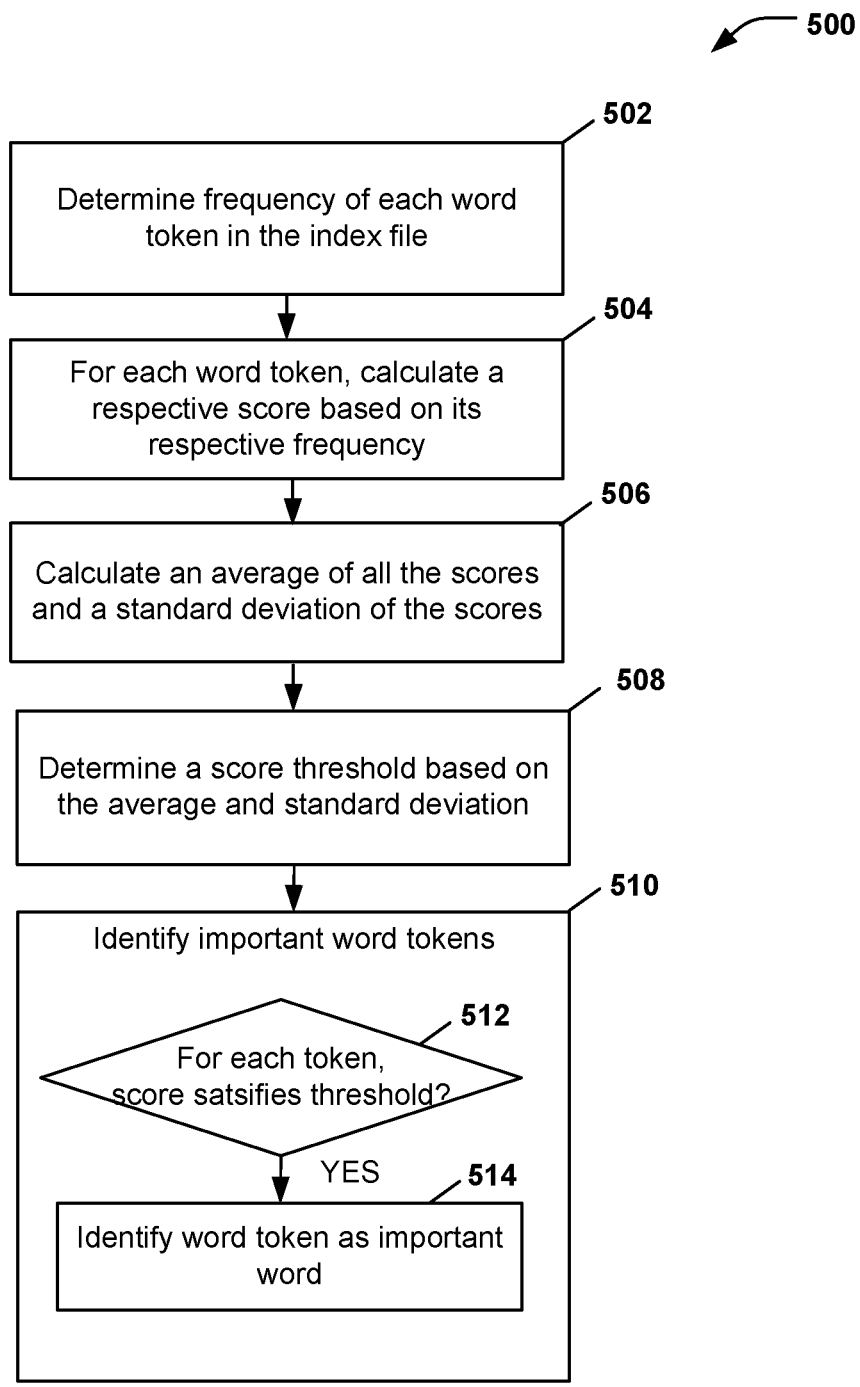
FIG. 5 illustrates a flow diagram illustrating a method for preprocessing an index file, according to some embodiments.

Referring now to FIG. 5 a flow diagram is depicted of a method 500 for preprocessing an index file, according to an embodiment. The method 500 begins at step 502, where the preprocessing module 104 determines the frequencies for each word token included in the index file. In other words, the preprocessing module 104 counts the number of times each word token appears in the index file.

At step 504, the preprocessing module 104 calculates a respective frequency score for reach word token in the index file based on its respective frequency. According to some embodiments, a frequency score for a word token may be calculated by calculating a base 10 logarithm of the number of times the word token appears in the index file.

At step 506, the preprocessing module 104 calculates an average ($\mu$) of all the frequency scores of each word token included in the index file and a standard deviation ($\sigma$) of all the frequency scores of each word token included in the index file. At step 508, the preprocessing module 104 determines a frequency score threshold based on the average and the standard deviation. In some embodiments, the frequency score threshold is calculated by first identifying a set of frequency scores that fall within the range given by [($\mu-\sigma$), ($\mu+\sigma$)]. The preprocessing module 104 then calculates the frequency score threshold as the average of all the identified frequency score thresholds that fall within the range.

At step 510, the preprocessing module identifies important word tokens by comparing the respective frequency scores of each word token with the frequency score threshold. Step 510 further includes step 512 and step 514. At step 512, the preprocessing module 104 determines whether the respective frequency score for each word token in the index file satisfies the frequency score threshold (e.g., greater than or equal to the frequency score threshold). If so, at step 514, the preprocessing module 104 identifies that word token as an important word token.

Example Computing Device

Figure 6:
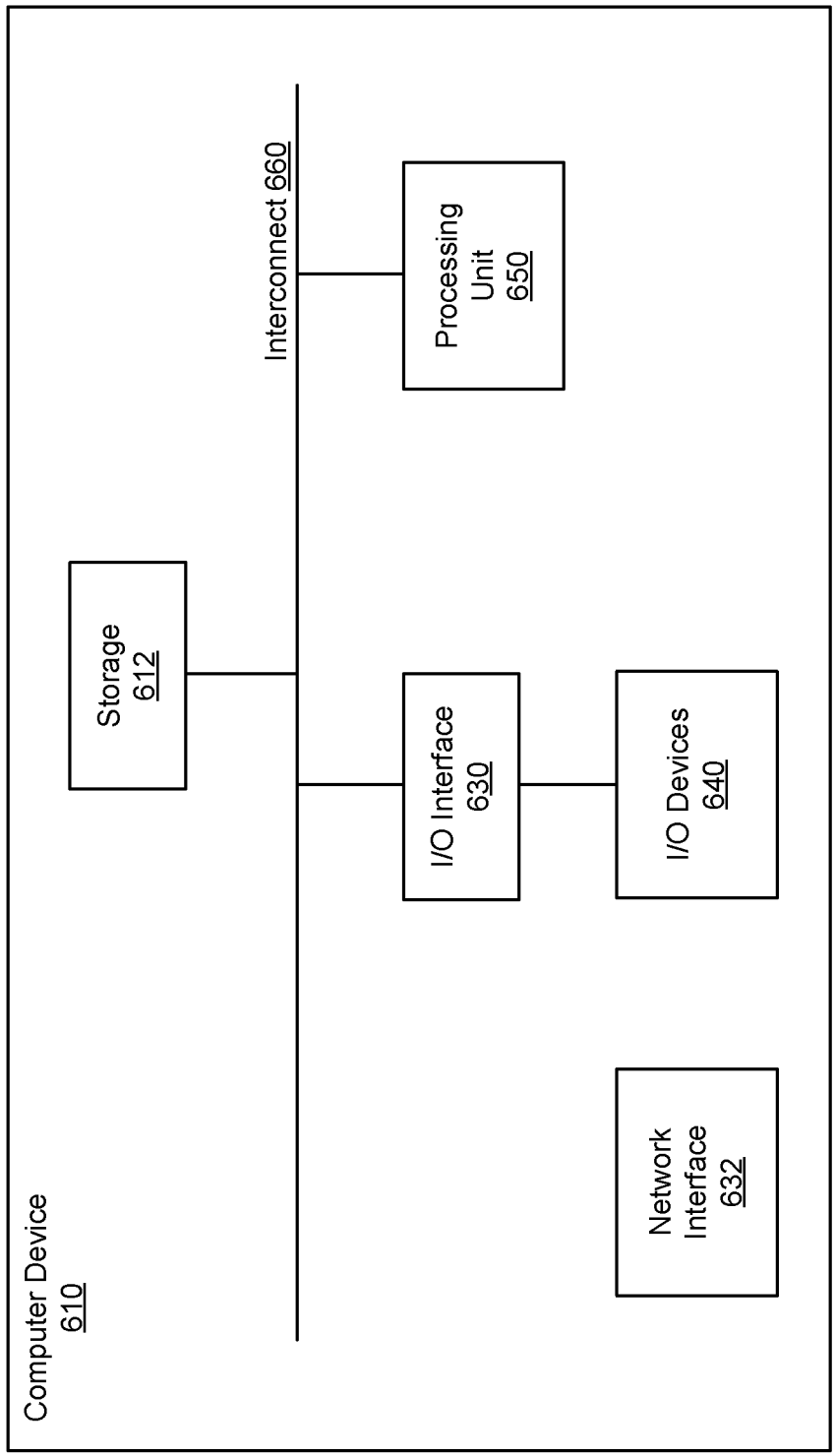
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including the components illustrated in FIG. 1. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   one or more hardware processors; and
   a memory storing computer-executable instructions, that in response to execution by the one or more hardware processors, causes the system to perform operations comprising:
      receiving an input set of characters of a logographic language and grouping the input set of characters into a plurality of character groups based on a grouping algorithm;
      determining respective romanizations of the character groups and determining respective translations of the character groups in a second language;
      based on the respective romanizations and the respective translations, generating a plurality of word tokens;
      performing a query on an index file using one or more subsets of the plurality of word tokens, the query returning one or more results;
      generating one or more token solution sets by comparing the plurality of word tokens with the one or more results;
      determining, based on a set of elimination criteria, whether to remove any token solution sets from the one or more token solutions sets and identifying one or more remaining token solution sets subsequent to the determining; and based on comparing the one or more remaining token solution sets with the one or more results, determining a match between the input set of characters and a first result of the one or more results.

2. The system of claim 1, wherein the logographic language is Chinese and the second language is English.

3. The system of claim 1, wherein the determining the match between the input set of characters and the first result further comprises:
   calculating a similarity score between a first token solution set of the one or more remaining token solution sets and a set of word tokens included in the first result; and
   determining that the similarity score satisfies a score threshold.

4. The system of claim 1, wherein the generating the one or more token solution sets further comprises:
   generating respective one more token solution sets for each result of the one or more results.

5. The system of claim 1, wherein the generating the one or more token solution sets further comprises:
   determining that an edit distance between a first word token from the plurality of word tokens and a second word token included in the index file satisfies a distance threshold.

6. The system of claim 1, wherein the generating the one or more token solution sets further comprises:
   accessing a lemmas file that stores a plurality of token pairs, the plurality of token pairs including a first token pair, wherein the first token pair includes a first word token and a second word token;
   determining that a third word token of the plurality of word tokens matches the first word token and that a fourth word token included in the index file matches the second word token; and
   responsive to determining that the third word token of the plurality of word tokens matches the first word token and that the fourth word token included in the index file matches the second word token, adding the third word token to a token solution set.

7. The system of claim 1, wherein the one or more token solution sets includes a first token solution set having one or more pairs of word tokens, wherein a first pair of the one or more pairs of word tokens includes a first word token from the plurality of word tokens and a corresponding second word token from the index file.

8. The system of claim 7, wherein the determining whether to remove any token solution sets from the one or more token solutions sets further comprises:
   in response to determining that the second word token corresponds to a romanization of one or more characters of the logographic language, determining whether the first word token is an exact match with the second word token.

9. The system of claim 8, further comprising:
   in response to determining that the first word token is not an exact match with the second word token, removing the first token solution set from the one or more token solution sets.

10. The system of claim 1, wherein the determining whether to remove any token solution sets from the one or more token solutions sets further comprises:
    determining whether a number of character groups represented by the one or more token solution sets satisfies a number threshold.

11. The system of claim 10, wherein the number threshold is determined based on a second number of character groups included in plurality of character groups.

12. A method, comprising:
    receiving, by a computer comprising one or more hardware processors, a plurality of characters of a first language that are unsegmented;
    segmenting, based on a character grouping algorithm, the plurality of characters into multiple groups, each group including one or more characters of the plurality of characters;
    determining a set of word tokens based on one or more transliterations of the multiple groups and one or more translations of the multiple groups to a second language;
    generating one or more word token solution sets by querying an index file using the set of word tokens, the index file including words of the second language; and
    determining whether the index file references an entity name corresponding to the plurality of characters of the first language based on comparing the one or more token solution sets with the index file.

13. The method of claim 12, wherein the index file stores a list of entries, each entry of the list of entries corresponding to a respective entity name, and wherein the method further comprises:
    for each respective entity name:
        calculating respective ranking scores for each word of the respective entity name; and
        based on the respective ranking scores, determining one or more words with ranking scores that meet or exceed a threshold for the respective entity name.

14. The method of claim 12, wherein the determining the set of word tokens further comprises:
    generating an initial set of word tokens comprised of each word token included in the one or more transliterations and each word token included in the one or more translations;
    identifying a first word token included in the initial set of word tokens as a duplicate of a second word token included in the initial set of word tokens; and
    in response to the identifying, removing the first word token from the initial set of word tokens.

15. The method of claim 12, wherein the querying the index file further comprises:
    generating a trigram from the set of word tokens; and
    performing a text search against the index file using the trigram.

16. The method of claim 12, wherein the generating one or more word token solution sets further comprises:
    generating an initial set of word token solution sets; and
    eliminating a first word token solution set from the initial set of word token solution sets according to elimination criteria.

17. A non-transitory computer readable medium storing computer-executable instructions that in response to execution by one or more hardware processors, causes a computer system to perform operations comprising:
    receiving a plurality of characters of a first language that are unsegmented;
    grouping, based on a character grouping algorithm, the plurality of characters into multiple groups, each group including one or more characters of the plurality of characters;

determining a set of word tokens based on one or more transliterations of the multiple groups and one or more translations of the multiple groups to a second language;

generating one or more word token solution sets by querying an index file using the set of word tokens, the index file including words of the second language; and determining whether the index file references an entity name corresponding to the plurality of characters of the first language based on comparing the one or more token solution sets with the index file.

18. The non-transitory computer readable medium of claim 17, wherein the determining the set of word tokens further comprises:

generating an initial set of word tokens comprised of each word token included in the one or more transliterations and each word token included in the one or more translations;

identifying a first word token included in the initial set of word tokens as a duplicate of a second word token included in the initial set of word tokens; and in response to the identifying, removing the first word token from the initial set of word tokens.

19. The non-transitory computer readable medium of claim 17, wherein the querying the index file further comprises:

generating a trigram from the set of word tokens; and performing a text search against the index file using the trigram.

20. The non-transitory computer readable medium of claim 17, wherein the generating one or more word token solution sets further comprises:

generating an initial set of word token solution sets; and eliminating a first word token solution set from the initial set of word token solution sets according to elimination criteria.

* * * * *